United States Patent Office 3,058,925
Patented Oct. 16, 1962

3,058,925
PROCESS FOR THE PREPARATION OF POLYURETHANE FOAMS
Paul Robitschek, Wilson, N.Y., assignor to Hooker Chemical Corporation, Niagara Falls, N.Y., a corporation of New York
No Drawing. Filed Oct. 2, 1958, Ser. No. 764,775
9 Claims. (Cl. 260—2.5)

This invention relates to the method of making various types of polyester-polyisocyanate mixtures and reaction products thereof.

The rigid plastic foams have found wide and varied use in industry. For instance, they may be used as core materials between skins of many and varied compositions. In aircraft construction the foam may be enclosed between aluminum or fiber glass reinforced plastic skins to form an assembly which is rigid, strong and yet remarkably light. Because of their excellent electrical properties, polyurethane foams enclosed by fiber glass reinforced plastic skins have also found use in the construction of radomes. The polyurethane foams have another useful property; they develop a high degree of adhesion during the foaming process. As a result they will adhere to skins composed of such varied materials as metals, plastics, ceramics, glass, etc. The resulting sandwich-type assemblies lend themselves well for use in such diverse fields as in the construction and insulation industries.

The rigid plastic foams can also be utilized without skins as insulating materials to surround hot water or steam pipes, valves, etc. Their utility for such applications is enhanced by their ability to be applied, foamed, and used in situ.

The rigid plastic foams have many desirable properties. They have great structural strength coupled with low density. In sandwich-type constructions they exhibit a high degree of rigidity, a property particularly desirable for building purposes. They are excellent vibration dampers and may thus support high resonant loads. Because of their fine cell structure they are excellent heat and sound insulators. The foam cells may be made very fine and uniform, so that the cells are tough and non-brittle and hence highly resistant to rupturing.

This invention has for one of its objects the attainment of a new process for making polyester-polyisocyanate based foams. It is a further object of this invention to obtain reduced consumption of expensive ingredients in the preparation of polyurethane foams. It is a further object to prepare by this process rigid cellular plastic materials having excellent physical properties; such as, very high strength, low density, high thermal resistance, good adhesion and insulating properties while still retaining all the advantages of conventional polyurethane foams. Further objects and advantages of this invention will appear more fully from the following description.

It has now been found that polyesters having a Gardner viscosity of at least 1000 seconds at fifty degrees centigrade or 9 Gardner seconds at a temperature of about one hundred and twenty degrees centigrade, and no higher than five hundred Gardner seconds at one hundred and sixty degrees centigrade, comprised of a polycarboxylic compound and a polyhydric alcohol can be reacted with a polyisocyanate and a foaming agent to prepare excellent polyurethane foams with the aforesaid superior physical properties. (The Gardner viscosity is measured using a standard Gardner viscosity tube. The tube is placed in a Gardner tube holder and the unit placed in an oil bath at the desired temperature. After a sufficient equilibration period, the viscosity is taken as the time in seconds required for the bubble to rise to the top of the tube in the usual manner.)

Examples of foams prepared from such alkyd resins will be found in our copending application SN 623,795, filed November 23, 1956, of which application this is a continuation-in-part. There we see a halogen containing alkyd resin comprised of (1) an adduct of hexahalocyclopentadiene and a polycarboxylic compound containing carbon-to-carbon unsaturation and (2) a polyhydric alcohol containing at least three hydroxyl groups. The alkyd thereby produced is subsequently reacted with a polyisocyanate in the presence of a foaming agent. The foam thereby produced has excellent physical properties and in addition is immediately self-extinguishing when a flame initially applied thereto is removed.

Among the hexahalocyclopentadiene carboxylic acid adducts which may be used in making the alkyd resins of this invention are: 1,4,5,6,7,7-hexachlorobicyclo-(2.2.1)-5-heptene-2,3-dicarboxylic acid (hereinafter referred to as chlorendic acid); 1,4,5,6-tetrachloro-7,7-difluorobicyclo-(2.2.1)-5-heptene - 2,3 - dicarboxylic acid; 1,4,5,6,7,7 - hexachlorobicyclo - (2.2.1) - 5 - heptene-2,3-dicarboxylic anhydride (hereinafter referred to as chlorendic anhydride); 1,4,5,6,7,7-hexachloro-2-methylbicyclo-(2.2.1) - 5 - heptene - 2,3 - dicarboxylic anhydride; 1,4,5,6,7,7 - hexachlorobicyclo - (2.2.1) - 5 - heptene-2 - acetic - 2 - carboxylic anhydride; and 1,4,5,6,7,7-hexaclorobicyclo - (2.2.1) - 5 - heptene - 2,3 - dicarbonyl chloride, which is the adduct of hexachlorocyclopentadiene with fumaryl chloride.

It has also been found that polyesters comprised of an adduct of hexahalocyclopentadiene and a polyhydric alcohol can be reacted with a polyisocyanate and a foaming agent to prepare excellent polyurethane foams with the aforesaid superior physical properties. Such foams can be produced from a foaming mixture comprised of (a) an alkyd resin comprised of (1) an adduct of hexahalocyclopentadiene and a polyhydric alcohol containing carbon-to-carbon unsaturation, (2) a polycarboxylic compound, and (3) a polyhydric alcohol containing at least three hydroxyl groups; (b) an aryl polyisocyanate; and (c) a foaming agent; or a foaming mixture which comprises (a) an alkyd resin comprised of (1) an adduct of hexahalocyclopentadiene and a polyhydric alcohol containing carbon-to-carbon unsaturation and (2) a polycarboxylic compound containing at least three carboxyl groups; (b) an aryl polyisocyanate; and (c) a foaming agent.

Among the hexahalocyclopentadiene-polyhydric alcohol adducts which may be used in making the alkyd resins of this invention are: 2,3-dimethylol-1,4,5,6,7,7-hexachlorobicyclo-(2.2.1)-5-heptene; and 3-(1,4,5,6,7,7-hexachlorobicyclo - (2.2.1) - 5 - heptene - 2 - yl) - methoxy-1,2-propanediol.

The preparation of these compounds is disclosed in copending application Serial No. 308,922 for "Poly-Halogen-Containing Polyhydric Compounds," filed September 10, 1952, by Paul Robitschek et al., now U.S. Patent 3,007,958. The combined-halogen-containing glycol adduct may then be (1) condensed with a dicarboxylic acid, and an additional polyhydric alcohol containing at least three functional groups in order to provide sufficient hydroxyl groups to enable the polyisocyanate compound to cross-link the alkyd resin formed; or it may be (2) reacted with a polycarboxylic compound having at least three carboxyl groups.

Other alkyds which can be used may be derived from aliphatic, cycloaliphatic and aromatic polyfunctional acids, acid anhydrides, acid halides, acid esters, and mixtures thereof, and polyfunctional alcohols. In addition, such reactants may be non-substituted or substituted by groups other than hydrogen or hydrocarbon groups.

Among the saturated aliphatic acids which may be used are oxalic, malonic, succinic, glutaric, adipic, sebacic, isosebacic, pimelic, azelaic, suberic, tricarballylic, dimethylsuccinic, etc.

Among the aliphatic types of polycarboxylic compounds containing aliphatic carbon-to-carbon unsaturation which may be used are maleic acid and maleic anhydride, fumaric acid, aconitic acid, citraconic acid, mesaconic acid, pyrocinchoninic acid, ethyl maleic acid, itaconic acid, and mixtures thereof.

Among aromatic compounds which may be used are phthalic acid, anhydride and halides; isophthalic acid, terephthalic acid, tetrachlorophthalic acid, anhydride and halides, etc.

Among the cycloaliphatic acids which may be used are cyclohexane, 1,2-dicarboxylic acid, cyclohexane 1,3-dicarboxylic acid, cyclohexane 1,4-dicarboxylic acid, etc.

Among the polyfunctional alcohols which may be used are ethylene glycol, diethyleneglycol, triethylene glycol, 1,3-propylene glycol, 1,2-propylene glycol, polyethylene glycol, dipropylene (1,3 and 1,2) glycol, butylene glycol, glycerol, trimethylol ethane, trimethylolpropane, 1,2,6-hexanetriol, pentaerythritol, etc.

Among the polycarboxylic compounds having at least three carboxyl groups which may be used are tricarballylic and citric acids and anhydrides.

Heretofore, polyurethane foams have invariably been prepared by mixing at or near room temperature a polyfunctional isocyanate and a polyester which is much less viscous at any of the temperatures discussed above than are the polyesters of this invention. During the mixing of these materials, heat is evolved due to an exothermic reaction and removal of this heat is required in order to control the reaction. The resulting polymerizing mass is most commonly expanded by using added water or carboxyl groups in the alkyd to furnish carbon dioxide on reaction with the isocyanate. A cellular product is obtained by the liberation of $CO_2$ which is trapped in the cellular mass. This procedure, however, limits the alkyd or polyester formulations to those which are liquid at room temperature, or much less viscous at the temperatures discussed above than are the alkyd resins of this invention. The fact that the prior art was so limited is a severe limitation indeed, as we have found that numerous highly desirable properties can be obtained from the use of formulations of the present invention.

Advantages of the present invention are numerous and include the use of less polyisocyanate, which is the most costly ingredient. Another advantage is that appreciable quantities of inexpensive materials like phthalic anhydride can be used in the alkyd formulation. Furthermore, the use of the alkyds of this invention allows the preparation of more highly branched rigid foams. Also less exothermic heat of reaction results during the foam expansion. Another advantage of such an alkyd is the fact that it allows the use of chlorinated products in amounts large enough to impart permanent fire resistance. Also such an alkyd enables the use of materials not previously usable in any appreciable amount, such as phthalic anhydride, 1,4,5,6,7,7-hexachlorobicyclo-(2.2.1)-5-heptene-2,3-dicarboxylic acid and tetrachlorophthalic anhydride and tetrafunctional alcohols such as pentaerythritol. Numerous other advantages will be readily apparent to those skilled in the art.

In order to obtain a satisfactory rigid foam based on dicarboxylic compounds, at least a portion of the total polyhydric alcohol component must consist of a polyhydric alcohol containing at least three hydroxyl groups. This is necessary in order to provide means for branching the alkyd. Where an even more rigid finally-cured structure is desired, the whole alcohol component may be made up of a polyfunctional alcohol, such as glycerol. Where a less rigid final product is desired, a difunctional polyhydric alcohol such as ethylene glycol or 1,4-butanediol may be utilized as part of the polyhydric alcohol component. Other glycols such as diethylene glycol, propylene glycol, etc., may also be used. The ratio of the polyhydric alcohol such as glycerol to the polybasic acid may be expressed as the hydroxyl-carboxyl ratio, and this ratio may be varied over a wide range such as 1:1 to 4:1. However, the preferred range is 1:6 to 1, to 2:0 to 1 for the best compressive strength.

The polyfunctional isocyanate concentration may be varied from about thirty to one hundred and thirty percent of isocyanato groups with respect to the sum of the alkyd and foaming agent, based on the number of hydroxyl and carboxyl groups in each. The foams obtained with the higher concentrations are resilient but the resiliency decreases with increasing amounts of isocyanate above one hundred percent. The foams made with thirty percent of isocyanate are very brittle. The preferred range for the foam of the present invention is about eighty-five to about one hundred and fifteen percent.

The use of the foregoing procedure generally results in pre-foam mixtures with temperatures from about fifty degrees centigrade to one hundred and thirty degrees centigrade. These temperatures can be adjusted to some extent by varying the temperature of the polyisocyanate used in the mixture. The most desirable mixing temperature will depend upon the reactivity and viscosity of the alkyd being used. The foaming agent generally can be added during this mixing process with no change in temperature. The resultant pre-foam can be cured at a temperature from about eighty degrees centigrade to about two hundred degrees centigrade, preferably at between one hundred and one hundred and sixty degrees centigrade.

A foaming system which is especially suitable for carrying out the foaming reaction at an elevated temperature is disclosed in our copending application Serial No. 623,796, now United States Patent 2,865,869, filed November 23, 1956, which discloses and claims the use of tertiary alcohols in the presence of acid catalysts, as for example t-butyl or t-amyl alcohols in the presence of sulfuric acid. It has been found that tertiary alcohols are very desirable as foaming agents in this process since they are easily dissolved in the polyester and produce gaseous olefins and carbon dioxide in situ under the influence of the diisocyanate. This material also allows a more controlled release of gas at these temperatures and leads to a simpler and more easily controlled process.

Other foaming agents which are useful in this process are formic acid, polymethylol phenols, polymethylol ureas and some activated secondary alcohols. Some of these materials are also disclosed in copending application Serial No. 623,795, filed November 23, 1956. The concentration of the foaming agent varies with the density of the foam desired.

Additional foaming agents which may be used are polycarboxylic acids and anhydrides, monocarboxylic acids and anhydrides, tetrahydroxymethylphosphonium chloride and water. The foaming agent must be a material which is capable of liberating gaseous products when reacted with an isocyanate.

If foaming is carried out at elevated temperatures, the presence of water, which is the conventional foaming agent known to the art, is not entirely suitable or desirable because of difficulties of controlling the reaction. However, with special care, high strength, low density foams can be formed, even in the presence of water. In addition, various secondary alcohols and glycols may be used such as 1-phenyl-1,2-ethanediol. Beta hydroxy aldehydes such as acetaldol may also be used. This compound is especially interesting since it has been found that it may be used without an acidic catalyst. Still other alcohols which may be used, although they give foams of somewhat higher density are 1,1-dimethyl-2-phenylethyl alcohol, 1-benzyl-1-cyclohexanol, and 2-methyl-2,4-pentanediol. Other materials which may be used are 1,4-butane-diol, 1,4-butenediol, and 2,2-diethyl-1,3-propanediol. Other types of foaming systems may be used as disclosed in the examples below.

When foaming agents are used which are of the alcoholic type, it is generally desirable to add a catalyst in order that they will function at a suitable temperature. The catalyst should be either a strong inorganic or organic acid, or a Lewis type acid. Among these are sulfuric acid, phosphoric acid, para toluene sulfonic acid, aluminum chloride, nitric acid, chloro-sulfonic acid, and hydrochloric acid.

The proportion of the various ingredients of the foaming composition of the present invention may be varied over a wide range to obtain various properties. For instance, if a foam having a high degree of fire-resistance is desired, a larger halogen content must be employed. Foams containing twenty-five percent or more halogen by weight are very highly fire-resistant. Foams which contain four percent or less combined halogen by weight have a lower degree of fire-resistance. When varying percentages of halogen are used, the foam will have varying degrees of fire-resistance, the degree being generally in proportion to the amount of halogen incorporated into the foam. In general, in order to obtain a foam which is fire-resistant even in the absence of other additives, the alkyd resin which is used to make the foam should have a halogen content of at least about ten percent by weight.

The amount of foaming agent used is not critical but will be dictated by the type of foam desired. If a very dense foam is desired, only a small amount need be used. If a very light foam is desired, a maximum amount may be used. The amount used will also depend upon the type of foaming agent. When using a foaming agent comprised of a tertiary alcohol such as tertiary amyl alcohol, it has been found that one point five grams is sufficient to foam a total ingredient mixture of thirty-five grams to produce a fire-resistant foam having a density of two point zero to two point five pounds per cubic foot. Additional foaming agent may be used if desired.

When the tertiary alcohol type of foaming agent such as tertiary butyl or tertiary amyl alcohol is used it must be used in conjunction with a catalytic amount of strong concentrated acid such as sulfuric acid. Generally speaking, up to one point five percent by weight of concentrated acid based on the total composition may be employed.

The alkyd resins used in the present invention are transformed into the liquid state at elevated temperatures before they are foamed. This is preferably accomplished by applying heat to the alkyd until a temperature causing suitable fluidity has been reached, which temperature will generally be from about fifty to about one hundred and seventy degrees centigrade.

The prior art invariably used alkyds which were liquid or whose viscosities were much less at the temperatures discussed above, than are the alkyds of the present invention. Additionally, the higher temperatures that the use of the alkyds of this invention necessitate could not be conveniently handled by techniques of the prior art.

The temperatures at which the solid alkyds of the present invention reach a suitable fluidity can be lowered somewhat by the inclusion of plasticizing substances, among which are such substances as chlorinated esters of fatty acids, phosphate esters, etc. Alternatively the alkyd viscosity may be reduced by suitable solvents such as ketones, aromatic hydrocarbons or chlorinated hydrocarbons. These temperatures can also be modified by the incorporation of reactive diluents, such as ethylene glycol, propylene glycol, etc.

After the alkyd resin has been heated, the resulting viscous liquid is then mixed with a polyisocyanate. A large number of various polyisocyanates may be used. The aromatic polyisocyanates are more reactive and less toxic than the aliphatic members and are consequently preferred. The compounds which are most readily available commercially are 2,4-tolylene diisocyanate, 2,6-tolylene diisocyanate and mixtures thereof. However, others may be used, among them methylene-bis-(4-phenyl isocyanate), 3,3'-bitolylene-4,4'-diisocyanate, 3,3'-dimethoxy-4,4'-biphenylene diisocyanate, naphthalene-1,5-diisocyanate, etc. Nacconate 80, a mixture containing eight percent of 2,4-tolylene diisocyanate and twenty percent 2,6-tolylene diisocyanate is frequently used since the material is readily available. However, this is not to be considered as limiting the scope of the invention.

It is often desirable to incorporate additionally a proportion of an aliphatic acid into the alkyd resin. Adipic acid is generally preferred for this purpose, although other suitable saturated acids may be used as oxalic, malonic, glutaric, pimelic, suberic, azelaic, etc. Unsaturated acids such as maleic, fumaric, itaconic, citraconic, aconitic may also be used.

Various additives can be incorporated which may serve to provide different properties. For instance, antimony oxide can be used to improve fire-resistance; fillers, such as wood flour, clay, calcium sulfate, or ammonium phosphate may be added to lower cost and improve density and fire-resistance; ingredients such as dyes may be added for color, and fibrous glass, asbestos or synthetic fibers may be added for strength. Plasticizers such as MPS-500, a mixture of methyl pentachlorostearate and epoxidized soy bean oil, may also be added to obtain desired properties.

The following are examples of the present invention. They are intended merely to be illustrative and not all inclusive.

*Example 1*

A combined-chloride solid alkyd resin was prepared in the following manner; a five liter three-necked flask equipped with an agitator, a thermometer and a nitrogen inlet tube leading into the reaction mixture was immersed in an oil bath. A ten-inch column packed with glass helices was installed in one neck of the flask and connected to a water-cooled condenser. Six hundred ninety-nine and nine-tenths grams of glycerol were placed in the reactor and the agitator started. After preheating the glycerol to one hundred degrees centigrade, nitrogen was passed through the reactor at a rate of 0.01 to 0.02 cubic foot per minute. Then 1555.5 grams of chlorendic acid, (1,4,5,6,7,7-hexachlorobicyclo-(2.2.1)-5-heptene-2, 3-dicarboxylic acid) and 292.3 grams of adipic acid were charged into the reaction flask. Heating and stirring were continued and the temperature of the reaction mixture was gradually raised to one hundred and fifty-eight to one hundred and sixty degrees centigrade over a period of one to one and one-quarter hours. After maintaining the reaction for an additional one and one-quarter hours at one hundred and fifty-eight to one hundred and sixty degrees centigrade, the nitrogen flow was increased to 0.03 cubic foot per minute. These conditions were maintained at one hundred and fifty-eight to one hundred and sixty degrees centigrade for five hours, and then the nitrogen flow was increased to 0.05 cubic foot per minute for an additional eight and one-half hours. At the end of this time, the acid number of the resin was sixteen. In order to lower the acid number, a vacuum of one hundred to two hundred millimeters was applied at the reaction temperature of one hundred and fifty-eight to one hundred and sixty degrees centigrade for three and one-half hours. The resulting amber-colored resin solidified when poured into a large flat pan, and was allowed to cool to room temperature. The resin had an acid number of 5.6, a water content of 0.079 percent, a density of 1.5 grams per cubic centimeter, a viscosity at 120 degrees centigrade of 200 Gardner seconds and a hydroxy-carboxyl ratio of 1.9 to 1.

*Example 2*

A non-chlorine containing solid alkyd resin was prepared in the following manner: a five liter three-necked flask equipped with an agitator, a thermometer and a nitrogen inlet tube leading into the reaction mixture was immersed in an oil bath. A ten-inch column packed with glass helices was installed in one neck of the flask and connected to a water-cooled condenser. Six hundred ninety-nine and nine-tenths grams of glycerol were placed in the reactor and the agitator started. After preheating the glycerol to one hundred degrees centigrade, nitrogen was passed through the reactor at a rate of 0.01 to 0.02 cubic foot per minute. Then 592.4 grams of phthalic anhydride and 292.3 grams of adipic acid were charged into the reaction flask. Heating and stirring were continued and the temperature of the reaction mixture was gradually raised to one hundred and fifty-eight to one hundred and sixty degrees centigrade over a period of one to one and one-quarter hours. After maintaining the reaction for an additional one and one-quarter hours at one hundred and fifty-eight to one hundred and sixty degrees centigrade the nitrogen flow was increased to 0.03 cubic foot per minute. These conditions were maintained at one hundred and fifty-eight to one hundred and sixty degrees centigrade for five hours, and then the nitrogen flow was increased to 0.05 cubic foot per minute for an additional eight and one-half hours. At the end of this time the acid number of the resin was one. The resulting resin solidified when poured into a large flat pan and was allowed to cool to room temperature. The resin was a hard and brittle solid at room temperature and possessed a viscosity at one hundred and twenty degrees centigrade of 17.5 Gardner seconds and a hydroxyl-carboxyl ratio of 1.9 to 1.

*Example 3*

A solid alkyd resin was prepared in a manner similar to that described in Example 1 with the exception that no adipic acid was used but the sole polycarboxylic acid component of the alkyd consisted of chlorendic acid. The equipment was the same as that described in Example 1. Six hundred ninety-nine and nine-tenths grams of glycerol was placed in the reactor and the agitator started. After a temperature of one hundred degrees centigrade had been attained, nitrogen was passed through the reactor at a rate of 0.01 to 0.02 cubic foot per minute. Two thousand three hundred and thirty-five grams of chlorendic acid were then charged into the flask. The heating and stirring was continued and the temperature of the reaction mixture was gradually raised to one hundred and fifty-eight to one hundred and sixty degrees over a period of one to one and one-quarter hours. After an additional one and one-quarter hours, at one hundred and fifty-eight to one hundred and sixty degrees centigrade the nitrogen flow rate was increased to 0.03 cubic foot per minute. This rate was maintained for an additional ten and one-half hours. The total reaction time to this point was eighteen hours. Nitrogen was vigorously blown through the reaction mixture for an additional fifteen hours while heating was continued. A vacuum of one hundred to two hundred millimeters was applied at the reaction temperature of one hundred and fifty-eight to one hundred and sixty degrees centigrade for seven hours. The resulting resin solidified upon cooling to room temperature. The solid alkyd resin thus prepared had an acid number of 14.0, a water content of 0.05, a viscosity at 160 degrees centigrade of 32.9 Gardner seconds and a hydroxyl-carboxyl ratio of 1.9 to 1.

*Example 4*

Twenty grams of a solid alkyd such as produced in Example 1, and four grams of MPS-500 (a mixture of methyl pentachlorostearate and five percent epoxidized soy bean oil) were weighed into a one hundred and twenty-five cc. beaker and heated on a hot plate while stirring with a thermometer until the mixture was completely fluid and homogeneous. The temperature of this mixture was adjusted to about one hundred and seven degrees centigrade. Then 12.6 grams of Nacconate 80, which had been kept at room temperature, were added and the mixture stirred for three and one-half minutes. The mixture became homogeneous in about one and one-half minutes. The temperature generally dropped from eighty-five to seventy degrees centigrade. At the end of this time 1.8 cc. of t-amylalcohol solution containing three drops of concentrated sulfuric acid was added and the mixture stirred and cooled to fifty degrees centigrade in a water bath. The creamy viscous mixture was maintained at this temperature for fifteen minutes with stirring. During this time the mixture thickened into a pasty mass. It was then heated with stirring to eighty degrees over a one to two minute period. The resulting fluid, creamy mass was poured into a sixteen ounce paper cup and the cup placed into a circulating oven at one hundred and twenty degrees centigrade for one hour. The foam rose to its maximum height in five to ten minutes and was fully cured in thirty to fifty minutes. The foam consisted of small uniform cells, had a density of 2.9 to 3.1 pounds per cubic foot, and a compressive yield strength of twenty to thirty pounds per square inch.

*Example 5*

Twenty grams of the hard brittle solid produced in Example 2 was heated to one hundred and seven degrees centigrade, and rapidly mixed with 17.5 grams of toluene diisocyanate at seventy-five to eighty-five degrees centigrade for nine minutes during which time the mixture became compatible. After cooling the solution to fifty degrees centigrade a mixture of 1.8 cubic centimeters of tertiary amyl alcohol and three drops of concentrated sulfuric acid was added. The mixture was then stirred at fifty degrees centigrade for twenty-four minutes, then heated with stirring to eighty degrees centigrade over a one to two minute period, and poured into a paper container. The foam was expanded and cured at one hundred and twenty degrees centigrade for one hour. The resulting foam had a density of 4.0 pounds per cubic foot and was very tough.

*Example 6*

Twenty grams of the solid alkyd produced in Example 3, and four grams of MPS-500 (a mixture of methyl pentachlorostearate and five percent epoxidized soy bean oil were weighted into a one hundred and twenty-five cubic centimeter beaker and heated on a hot plate while stirring with a thermometer until the mixture was completely fluid and homogeneous. The temperature of this mixture was adjusted to about one hundred and twenty-five degrees centigrade. Then 11.4 grams Nacconate 80, which had been kept at room temperature, were added and the mixture stirred for three and one-half minutes. The mixture was then cooled to fifty-eight degrees centigrade over a two and one-half minute period. At the end of this time, 1.8 cc. of t-amyl alcohol solution containing three drops of concentrated sulfuric acid was added and the mixture stirred at fifty-five to sixty degrees centigrade for three and one-half minutes. During this time, the mixture thickened into a pasty mass. It was then heated with stirring to eighty degrees centigrade over a one to two minute period. The resulting fluid, creamy mass was poured into a sixteen ounce paper cup and the cup placed into a circulating oven at one hundred and twenty degrees centigrade for one hour. The foam rose to its maximum height in five to ten minutes and was fully cured in thirty to fifty minutes. The resulting foam had a density of three pounds per cubic foot. The material had good cell structure.

*Example 7*

An adduct of hexachlorocyclopentadiene and alpha allyl glyceryl ether was prepared as described in copending application Serial No. 308,922, filed September 10, 1952. One-half mole (203 grams) of this adduct, one mole (136 grams) of pentaerythritol and one mole (148 grams) of phthalic anhydride were reacted in a one-liter, three-necked flask using toluene to remove the water in a Dean-Stark trap at a reaction temperature of two hundred to two hundred and ten degrees centigrade. When an acid number of twenty-four was reached, the reaction was discontinued and the toluene removed by vacuum distillation. The final resin was a hard, brittle solid having a hydroxyl-carboxyl ratio of 2.5 to 1 and a Gardner viscosity at 120 degrees centigrade of 100 seconds.

Example 8

The resin of Example 7 was plasticized by the addition of twenty percent tricresylphosphate by weight by stirring the mixture at elevated temperatures. Twenty grams of the plasticized resin was heated to eighty degrees centigrade and 14.6 grams of toluene diisocyanate was slowly added with stirring. The mixture was held for two minutes at sixty degrees centigrade and one milliliter of foaming agent (mixture of ten parts tertiary amyl alcohol and one part concentrated sulfuric acid) was added. The prefoam was held at sixty degrees centigrade for seven minutes and poured into a Dixie cup and cured at one hundred and twenty degrees centigrade for one hour. A foam was obtained having a density of 4.5 pounds per cubic foot.

The polyesters used in the present invention are either maintained in the liquid state at about or somewhat below the elevated temperatures at which they are formed or if previously cooled, are transformed into the liquid state at elevated temperatures before they are foamed. This is preferably accomplished by applying heat to the polyester until a temperature causing suitable fluidity has been reached, while temperature will generally be from about fifty to about one hundred and seventy degrees centigrade.

It is to be understood that the invention is not limited to the specific examples which have been offered merely as illustrative and that modifications may be made within the scope of the appended claims without departing from the spirit of the invention.

I claim:
1. A process for the preparation of polyurethane foams which comprises: (I) preparing an alkyd resin which has a viscosity of from nine Gardner seconds at about one hundred and twenty degrees centigrade to five hundred Gardner seconds at one hundred and sixty degrees centigrade, said alkyd resin selected from the group consisting of: (a) the reaction product of (A) an adduct of hexahalocyclopentadiene and a dicarboxylic compound containing aliphatic carbon-to-carbon unsaturation, wherein the halogen is selected from the group consisting of chlorine, bromine, fluorine, and mixtures thereof and (B) a polyhydric alcohol containing at least three hydroxyl groups, and (b) the reaction product of (A) an adduct of hexahalocyclopentadiene and a polyhydric alcohol containing aliphatic carbon-to-carbon unsaturation, wherein the halogen is selected from the group consisting of chlorine, bromine, fluorine and mixtures thereof, (B) a polycarboxylic compound and (C) a polyhydric alcohol containing at least 3 hydroxyl groups; and said alkyd resin having a hydroxyl-carboxyl ratio of from about 1:4 to 4:1;
(II) heating said alkyl resin to a temperature of from about fifty degrees centigrade to about one hundred and seventy degrees centigrade;
(III) mixing said alkyd resin with an organic polyisocyanate and a foaming agent which is capable of liberating gaseous products when reacted with said polyisocyanate in a mixing zone, while maintaining the temperature of the mixed materials in said mixing zone between about fifty degrees centigrade and about one hundred and thirty degrees centigrade;
(IV) discharging the blend of the alkyd-polyisocyanate and foaming agent from the mixing zone; and
(V) expanding and curing the resulting blend at a temperature from about eighty degrees centigrade to about two hundred degrees centigrade.

2. A process for the preparation of polyurethane foams which comprises: (I) preparing an alkyd resin which has a viscosity of nine Gardner seconds at about one hundred and twenty degrees centigrade to five hundred Gardner seconds at one hundred and sixty degrees centigrade said alkyd resin comprising the reaction product of (A) an adduct of hexahalocyclopentadiene and a dicarboxylic compound containing aliphatic carbon-to-carbon unsaturation, wherein the halogen is selected from the group consisting of chlorine, bromine, fluorine and mixtures thereof, and (B) a polyhydric alcohol containing at least three hydroxyl groups; and said alkyd resin having a hydroxyl-carboxyl ratio of from about 1:1 to about 4:1, (II) heating said alkyd resin to a temperature of from about fifty degrees centigrade to about one hundred and seventy degrees centigrade; (III) mixing said alkyd resin with an organic polyisocyanate and a foaming agent which is capable of liberating gaseous products when reacted with said polyisocyanate in a mixing zone while maintaining the temperature of the mixed materials in said mixing zone between about fifty degrees centigrade and about one hundred and thirty degrees centigrade; (IV) discharging the blend of the alkyd, polyisocyanate and foaming agent from the mixing zone; and (V) expanding and curing the resulting blend at a temperature of from about eighty degrees centigrade to about two hundred degrees centigrade.

3. A process according to claim 2 wherein the polyisocyanate is selected from the group consisting of: 2,4-tolylene diisocyanate; 2,6-tolylene diisocyanate; methylenebis - (4 - phenylisocyanate); 3,3 - bitolylene - 4,4' - diisocyanate; 3,3' - dimethoxy - 4,4' - biphenylene diisocyanate; naphthalene-1,5-diisocyanate; and mixtures thereof; and the foaming agent is selected from the group consisting of: a tertiary alcohol and a catalytic amount of concentrated acid; polymethylol phenols; polymethylol ureas; activated secondary alcohols; polycarboxylic acids and anhydrides; beta hydroxy aldehydes; monocarboxylic acids and anhydrides; tetrahydroxymethylphosphonium chloride; water; and mixtures thereof.

4. A process according to claim 3 wherein the hexahalocyclopentadiene adduct is 1,4,5,6,7,7-hexachlorobicyclo-(2.2.1)-5-heptene-2,3-dicarboxylic acid.

5. A process according to claim 3 wherein the hexahalocyclopentadiene adduct is 1,4,5,6,7,7-hexachlorobicyclo-(2.2.1)-5-heptene-2,3-dicarboxylic anhydride.

6. A process for the preparation of polyurethane foams which comprises: (I) preparing an alkyd resin which has a viscosity of 9 Gardner seconds at about one hundred and twenty degrees centigrade to five hundred Gardner seconds at one hundred and sixty degrees centigrade, said alkyd resin comprising the reaction product of (A) an adduct of hexahalocyclopentadiene and a polyhydric alcohol containing aliphatic carbon-to-carbon unsaturation, wherein the halogen is selected from the group consisting of chlorine, bromine, fluorine and mixtures thereof, (B) a polycarboxylic compound, and (C) a polyhydric alcohol containing at least three hydroxyl groups and said alkyd resin having a hydroxyl-carboxyl ratio of from about 1:1 to about 4:1; (II) heating said alkyd resin to a temperature of from about fifty degrees centigrade to about one hundred and seventy degrees centigrade; (III) mixing said alkyd resin with an organic polyisocyanate and a foaming agent which is capable of liberating gaseous products when reacted with said polyisocyanate in a mixing zone while maintaining the temperature of the mixed materials in said mixing zone between about fifty degrees centigrade and about one hundred and thirty degrees centigrade; (IV) discharging the blend of the alkyd, polyisocyanate and foaming agent from the mixing zone; and (V) expanding and curing the resulting blend at a temperature of from about eighty degrees centigrade to about two hundred degrees centigrade.

7. A process according to claim 6 wherein the polyisocyanate is selected from the group consisting of: 2,4-tolylene diisocyanate; 2,6-tolylene diisocyanate; methylene - bis - (4 - phenylisocyanate); 3,3' - bitolylene - 4,4'-diisocyanate; 3,3'-dimethoxy-4,4'-biphenylene diisocyanate; naphthalene-1,5-diisocyanate; and mixtures thereof; and the foaming agent is selected from the group consisting of: a tertiary alcohol and a catalytic amount of concentrated acid; polymethylol phenols; polymethylol ureas; activated secondary alcohols; polycarboxylic acids and anhydrides; beta hydroxy aldehydes; monocarboxylic acids and anhydrides; tetrahydroxymethylphosphonium chloride; water; and mixtures thereof.

8. A process according to claim 7 wherein the adduct is 2,3-dimethylol-1,4,5,6,7,7-hexachlorobicyclo-(2.2.1)-5-heptene.

9. A process according to claim 7 wherein the adduct is 3 - (1,4,5,6,7,7 - hexachlorobicyclo - (2.2.1) - 5 - heptene-2-yl)-methoxy-1,2-propanediol.

References Cited in the file of this patent

UNITED STATES PATENTS

| | | |
|---|---|---|
| 2,606,910 | Herzfeld et al. | Aug. 10, 1952 |
| 2,621,166 | Schmidt et al. | Dec. 9, 1952 |
| 2,650,212 | Windemuth | Aug. 25, 1953 |
| 2,779,689 | Reis | Jan. 29, 1957 |
| 2,783,215 | Robitschek et al. | Feb. 26, 1957 |
| 2,865,869 | Hindersinn et al. | Dec. 23, 1958 |

UNITED STATES PATENT OFFICE
CERTIFICATE OF CORRECTION

Patent No. 3,058,925                          October 16, 1962

Paul Robitschek

It is hereby certified that error appears in the above numbered patent requiring correction and that the said Letters Patent should read as corrected below.

Column 1, line 58, for "1000" read -- 2000 --; column 6, line 6, for "eight" read -- eighty --; line 33, for "combined-chloride" read -- combined-chlorine --; column 8, line 44, for "oil were weighted" read -- oil) were weighed --; column 9, lir 32, for "while" read -- which --.

Signed and sealed this 22nd day of June 1965.

(SEAL)
Attest:

ERNEST W. SWIDER                               EDWARD J. BRENNER
Attesting Officer                                   Commissioner of Patents